(12) United States Patent
Nishide

(10) Patent No.: US 11,656,814 B2
(45) Date of Patent: May 23, 2023

(54) PRINTING SYSTEM AND PRINTING METHOD

(71) Applicant: SCREEN HOLDINGS CO., LTD., Kyoto (JP)

(72) Inventor: Hiroshi Nishide, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/665,066

(22) Filed: Feb. 4, 2022

(65) Prior Publication Data
US 2022/0283754 A1 Sep. 8, 2022

(30) Foreign Application Priority Data
Mar. 2, 2021 (JP) .............................. JP2021-032715

(51) Int. Cl.
*G06F 7/06* (2006.01)
*G06F 3/12* (2006.01)

(52) U.S. Cl.
CPC .......... *G06F 3/1215* (2013.01); *G06F 3/1262* (2013.01)

(58) Field of Classification Search
CPC .... G06F 3/1215; G06F 3/1262; G06F 3/1264; G06F 7/08; G06F 7/22
USPC ............... 358/1.15, 1.9; 399/43, 407; 101/2
See application file for complete search history.

(56) References Cited

U.S. PATENT DOCUMENTS

2007/0277693 A1* 12/2007 Drexler .............. G03G 15/6564
101/485
2011/0311287 A1* 12/2011 Has ....................... G06F 3/1262
400/76

FOREIGN PATENT DOCUMENTS

JP 2010-072313 A 4/2010
JP 2015-174331 A 10/2015

* cited by examiner

*Primary Examiner* — Jamares Q Washington
(74) *Attorney, Agent, or Firm* — McDermott Will & Emery LLP

(57) ABSTRACT

A printing system including a printer that sends a printed print medium to a post-processing machine is provided with: a job sorting unit that sorts a plurality of jobs into a plurality of groups; a required printing time calculation unit that calculates a required printing time per set required for printing for each job; a short job determination unit that determines, as a short job, a job for which the required printing time is shorter than a minimum processing time that is a minimum time required for processing for one set in the post-processing machine; and a job group generation unit that generates, on the basis of a plurality of jobs sorted into the same group, a job group obtained by grouping standard jobs (jobs not determined as short jobs) and a job group obtained by grouping short jobs.

14 Claims, 15 Drawing Sheets

Fig.11

|  | J1 | J2 | J3 | J4 | J5 | J6 | J7 |
|---|---|---|---|---|---|---|---|
| NUMBER OF PAGES | 200 | 240 | 320 | 360 | 400 | 480 | 520 |
| NUMBER OF SHEETS | 25 | 30 | 40 | 45 | 50 | 60 | 65 |
| PRINT LENGTH PER SET (m) | 4.25 | 5.1 | 6.8 | 7.65 | 8.5 | 10.2 | 11.05 |

Fig.12

|  | J1 | J2 | J3 | J4 | J5 | J6 | J7 |
|---|---|---|---|---|---|---|---|
| PRINT SPEED : 100mpm (1.666667mps) | 2.55 | 3.06 | 4.08 | 4.59 | 5.1 | 6.12 | 6.63 |
| PRINT SPEED : 75mpm (1.25mps) | 3.4 | 4.08 | 5.44 | 6.12 | 6.8 | 8.16 | 8.84 |
| PRINT SPEED : 50mpm (0.833333mps) | 5.1 | 6.12 | 8.16 | 9.18 | 10.2 | 12.24 | 13.26 |
| PRINT SPEED : 25mpm (0.416667mps) | 10.2 | 12.24 | 16.32 | 18.36 | 20.4 | 24.48 | 26.52 |

Fig.13

| PRINT LENGTH (m) | PRINT SPEED (mpm) | REQUIRED TIME (min) |
|---|---|---|
| 8,000 | 50 | 160 |

Fig.14

| PRINT LENGTH (m) | PRINT SPEED (mpm) | REQUIRED TIME (min) |
|---|---|---|
| 400 | 50 | 8 |
| 50 |  | 4 |
| 7,600 | 100 | 76 |
|  | TOTAL REQUIRED TIME (min) | 88 |

| PRINT LENGTH (m) | PRINT SPEED (mpm) | REQUIRED TIME (min) |
|---|---|---|
| 400 | 15 | 27 |
| 7,600 | 100 | 76 |
| | TOTAL REQUIRED TIME (min) | 103 |

| PRINT LENGTH (m) | PRINT SPEED (mpm) | REQUIRED TIME (min) |
|---|---|---|
| 400 | 50 | 8 |
| 7,600 | 100 | 76 |
| | TOTAL REQUIRED TIME (min) | 84 |

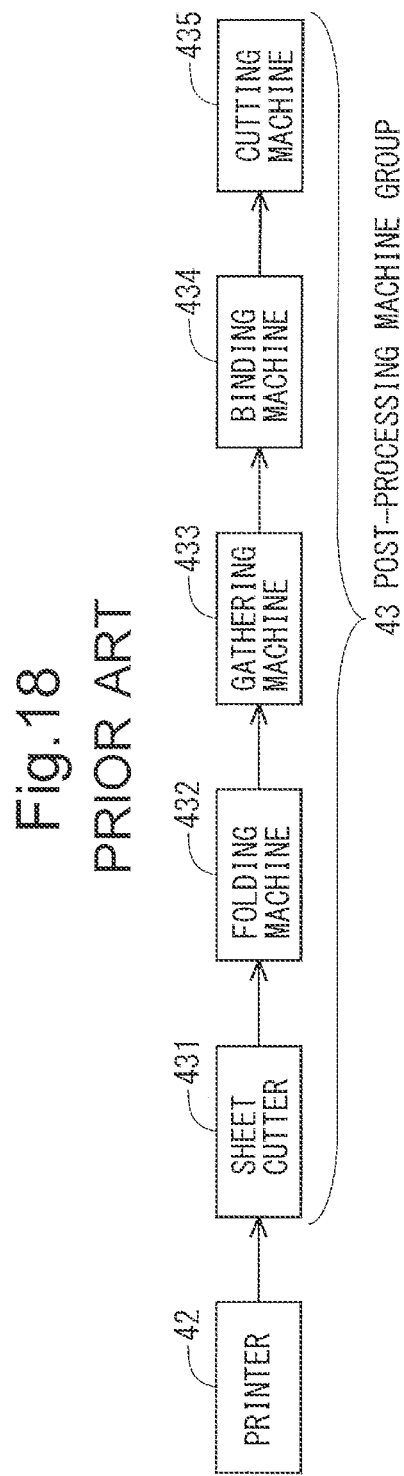

PRINTING SYSTEM AND PRINTING METHOD

BACKGROUND OF THE INVENTION

Field of the Invention

The present invention relates to a printing system and a printing method, and more particularly to a printing system and a printing method for performing printing by using a printer capable of continuous printing based on a plurality of jobs.

Description of Related Art

Conventionally, as an apparatus for performing printing and binding of a book or the like, a printer that performs printing on a base material and a post-processing machine that performs a process called "post-processing" on a printed base material are known. In recent years, digital printers (e.g., inkjet printer) have been increasingly employed as printers. In a digital printer used for bookbinding, long belt-shaped printing paper (continuous paper) called rolled paper is typically employed as a base material. Various types of apparatuses are known as post-processing machines. For example, in a printing-bookbinding system, as shown in FIG. 18, the following are used as the post-processing machine: a sheet cutter 431 that cuts continuous paper after printing by a printer 42 into a specified size; a folding machine 432 that creates a signature from paper cut into the specified size, a gathering machine 433 that gathers a plurality of signatures, a binding machine 434 that performs binding processing on a signature group in a collated state, and a cutting machine 435 that performs three-way cutting. Note that post-processing machines to be used differ depending on the type of a final product.

In recent years, high-mix small-lot production has been increasingly performed for printing and bookbinding. When high-mix small-lot production is performed, the frequency at which human work is required is higher than when small-variety mass production is performed. When human work is required, the cost increases, and the probability of occurrence of defective products and the like due to work errors also increases. Therefore, in recent years, the in-line process from printing to bookbinding has been advanced. According to the in-line system, the process from printing to bookbinding can be performed in a consistent and automatic manner. Thus, even when high-mix small-lot production is performed, it is possible to prevent the occurrence of defective products and the like due to work errors. It is also possible to shorten the delivery time and reduce the cost as compared with the related art.

Note that the following related art documents are known in connection with the present invention. Japanese Laid-Open Patent Publication No. 2010-72313 discloses a technique that prevents bookbinding failure and stoppage of equipment, regarding a bookbinding apparatus system including an image forming apparatus, a folding apparatus, and a bookbinding apparatus. Japanese Laid-Open Patent Publication No. 2015-174331 discloses a technique that reduces the occurrence of problems caused by the type of post-processing, regarding an image forming system including an image forming apparatus and a post-processing apparatus.

Regarding a step of performing post-processing for bookbinding by using printed continuous paper as a base, there is a time restriction on a switching mechanism for shifting from a process for a certain set (one copy) to a process for a next set (one copy). For example, in the configuration shown in FIG. 18, it is necessary to switch a path every time one book block is created in the gathering machine 433, and a certain time interval is required from a start point of a process in a certain path to a start point of a process in another path. In this regard, in a case where the process by the post-processing machine is started from a state in which the printed rolled paper is set in an unwinding machine, that is, in a case where a configuration in which the digital printer and the post-processing machine are not directly connected (non-inline configuration) is employed, even when there is the time restriction, it is possible to prevent the occurrence of an error in the post-processing machine by, for example, setting a conveyance speed on the post-processing machine side on the basis of the minimum number of pages among the number of pages of each of a large number of books to be processed or stopping the feeding of the rolled paper as necessary.

However, in a case where the configuration an which the digital printer and the post-processing machine are directly connected (in-line configuration) is employed, a sheet is fed to the post-processing machine in accordance with the print speed in the digital printer. Therefore, for example, when the printed sheet for a book with a small number of paces is fed to the post-processing machine, the process in the post-processing machine may not be in time for the feeding speed of the sheet. In such a case, the process in the post processing machine becomes an error, and it is necessary to stop the printing process in the digital printer. This causes waste paper and increases the time required for printing and bookbinding.

Therefore, in a case where the in-line configuration is employed, printing is performed in the digital printer at such a speed that no error occurs in the post-processing machine. In this regard, a general digital printer can select an actual print speed from a plurality of speeds. However, changing the print speed during printing reduces print quality. Thus, in a case where a job of a book with a large number of pages and a job of a book with a small number of pages are mixed as process targets when one continuous printing is executed, the print speed has to be reduced in consideration of the job of the book with a small number of pages. As a result, the printing time increases, and the productivity decreases. It is conceivable to execute a job in which the occurrence of an error is expected in the process of the post-processing machine and the other jobs as separate continuous printing (perform printing at different print speeds). However, it is extremely difficult to visually sort the job in which the occurrence of the error is expected and the other jobs from a list presenting the information of the enormous number of jobs having different types and different numbers of pages of final products.

Note that Japanese Laid-Open Patent Publication No. 2010-72313 and Japanese Laid-Open Patent Publication No. 2015-174331 do not describe the above time restriction regarding the post-processing machine.

SUMMARY OF THE INVENTION

In view of the above circumstances, an object of the present invention is to achieve a printing system capable of improving productivity more than before without causing an error in a post-processing machine.

One aspect of the present invention is directed to a printing system including a printer that is capable of executing continuous printing for each job group made up of a plurality of jobs and sends a printed print medium to a post-processing machine, the printing system including:

a job sorting unit configured to sort a plurality of jobs into a plurality of groups on a basis of printing-bookbinding job information including information related to specifications of each job and a predefined sorting condition;

a required printing time calculation unit configured to calculate a required printing time that is a time per set required for the printer to perform printing on a basis of each job;

a short job determination unit configured to compare the required printing time for each job with a minimum processing time that is a minimum time required from a start point of a process for one set to a start point of a process for a next one set in the post-processing machine and determine, as a short job, a job for which the required printing time is shorter than the minimum processing time; and a job group generation unit configured to generate a first-type job group obtained by grouping jobs each not determined as the short job by the short job determination unit and generate a second-type job group obtained by grouping jobs each determined as the short job by the short job determination unit, based on a plurality of jobs sorted into same group by the job sorting unit.

With such a configuration, the required printing time (time per set required for the printer to execute printing) and the minimum processing time (minimum time required for the process for one set in the post-processing machine) are compared for each job, and a job for which the required printing time is shorter than the minimum processing time is determined as a short job. Then, based on a plurality of jobs sorted into the same group on the basis of specifications of each job, a first-type job group obtained by grouping jobs not determined as short jobs and a second-type job group obtained by grouping jobs determined as short jobs are generated. Here, by executing printing based on the second-type job group at a low speed and executing printing based on the first-type job group at a high speed, it is possible to shorten the total printing time as much as possible while preventing the occurrence of an error in the post-processing machine. As above, a printing system capable of improving productivity more than before without causing an error in the post-processing machine is achieved.

Another aspect of the present invention is directed to a printing system including a printer that is capable of executing continuous printing for each job group made up of a plurality of jobs and sends a printed print medium to a post-processing machine, the printing system including:

a job sorting unit configured to sort a plurality of jobs into a plurality of groups on a basis of printing-bookbinding job information including information related to specifications of each job and a predefined sorting condition;

a required printing time calculation unit configured to calculate a required printing time that is a time per set required for the printer to perform printing on a basis of each job;

a short job determination unit configured to compare the required printing time for each job with a minimum processing time that is a minimum time required from a start point of a process for one set to a start point of a process for a next one set in the post-processing machine and determine, as a short job, a job for which the required printing time is shorter than the minimum processing time; and a job group generation unit configured to generate a job group obtained by grouping a plurality of jobs sorted into same group by the job sorting unit such that printing based on a standard job block obtained by collecting jobs each not determined as the short job by the short job determination unit is executed after printing based on a short job block obtained by collecting jobs each determined as the short job by the short job determination unit is executed, or the printing based on the short job block is executed after the printing based on the standard job block is executed.

With such a configuration, the required printing time (time per set required for the printer to execute printing) and the minimum processing time (minimum time required for the process for one set in the post-processing machine) are compared for each job, and a job for which the required printing time is shorter than the minimum processing time is determined as a short job. Then, a job group including a plurality of jobs sorted into the same group on the basis of specifications of each job is generated such that short jobs are printed collectively and standard jobs (jobs not determined as short jobs) are printed collectively. Here, for example, by executing printing based on a short job block (a plurality of short jobs) at a low speed and then executing printing based on a standard job block (a plurality of standard jobs) at a high speed, it is possible to shorten the entire printing time as much as possible while preventing the occurrence of an error in the post-processing machine. As above, a printing system capable of improving productivity more than before without causing an error in the post-processing machine is achieved.

Still another aspect of the present invention is directed to a printing method in a printing system including a printer that is capable of executing continuous printing for each job group made up of a plurality of jobs and sends a printed print medium to a post-processing machine, the printing method including:

a job sorting step of sorting a plurality of jobs into a plurality of groups on a basis of printing-bookbinding job information including information related to specifications of each job and a predefined sorting condition;

a required printing time calculation step of calculating a required printing time that is a time per set required for the printer to perform printing on a basis of each job;

a short job determination step of comparing the required printing time for each job with a minimum processing time that is a minimum time required from a start point of a process for one set to a start point of a process for a next one set in the post-processing machine and determining, as a short job, a job for which the required printing time is shorter than the minimum processing time; and a job group generation step of generating a first-type job group obtained by grouping jobs each not determined as the short job in the short job determination step and generating a second-type job group obtained by grouping jobs each determined as the short job in the short job determination step, based on a plurality of jobs sorted into same group in the job sorting step.

These and other objects, features, modes, and advantageous effects of the present invention will become more apparent from the following detailed description of the present invention with reference to the accompanying drawings.

BRIEF DESCRIPTION OF THE DRAWINGS

FIG. 11 is a diagram for explaining a specific example in the first embodiment.

FIG. 12 is a diagram for explaining a specific example in the first embodiment.

FIG. 13 is a diagram for explaining a specific example in the first embodiment.

FIG. 14 is a diagram for explaining a specific example in the first embodiment.

FIG. 18 is a block diagram showing a configuration example of a post-processing machine group.

DETAILED DESCRIPTION OF PREFERRED EMBODIMENTS

Embodiments of the present invention will be described below with reference to the accompanying drawings.

1. First Embodiment

<1.1 Configuration of Printing System>

Figure 1:
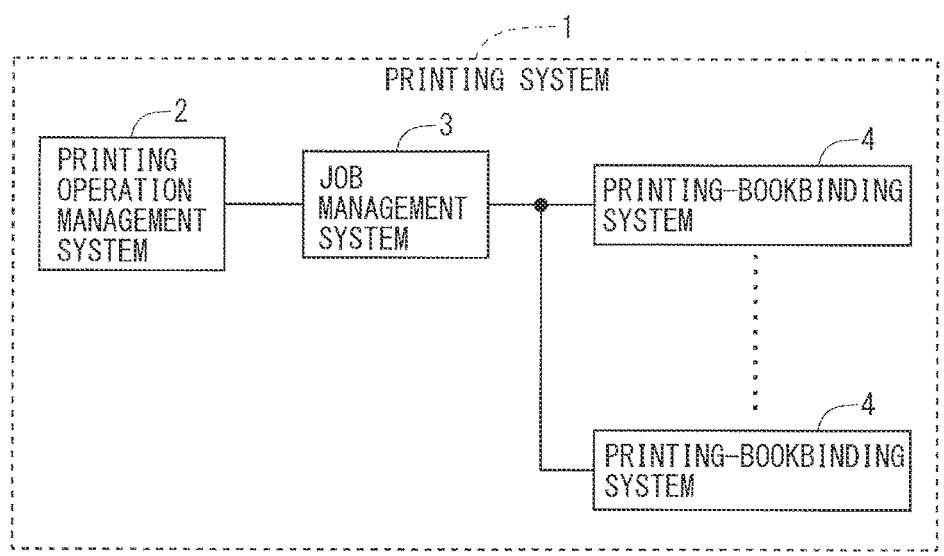
FIG. 1 is a block diagram showing a schematic configuration of a printing system in a first embodiment of the present invention.
Figure 2:
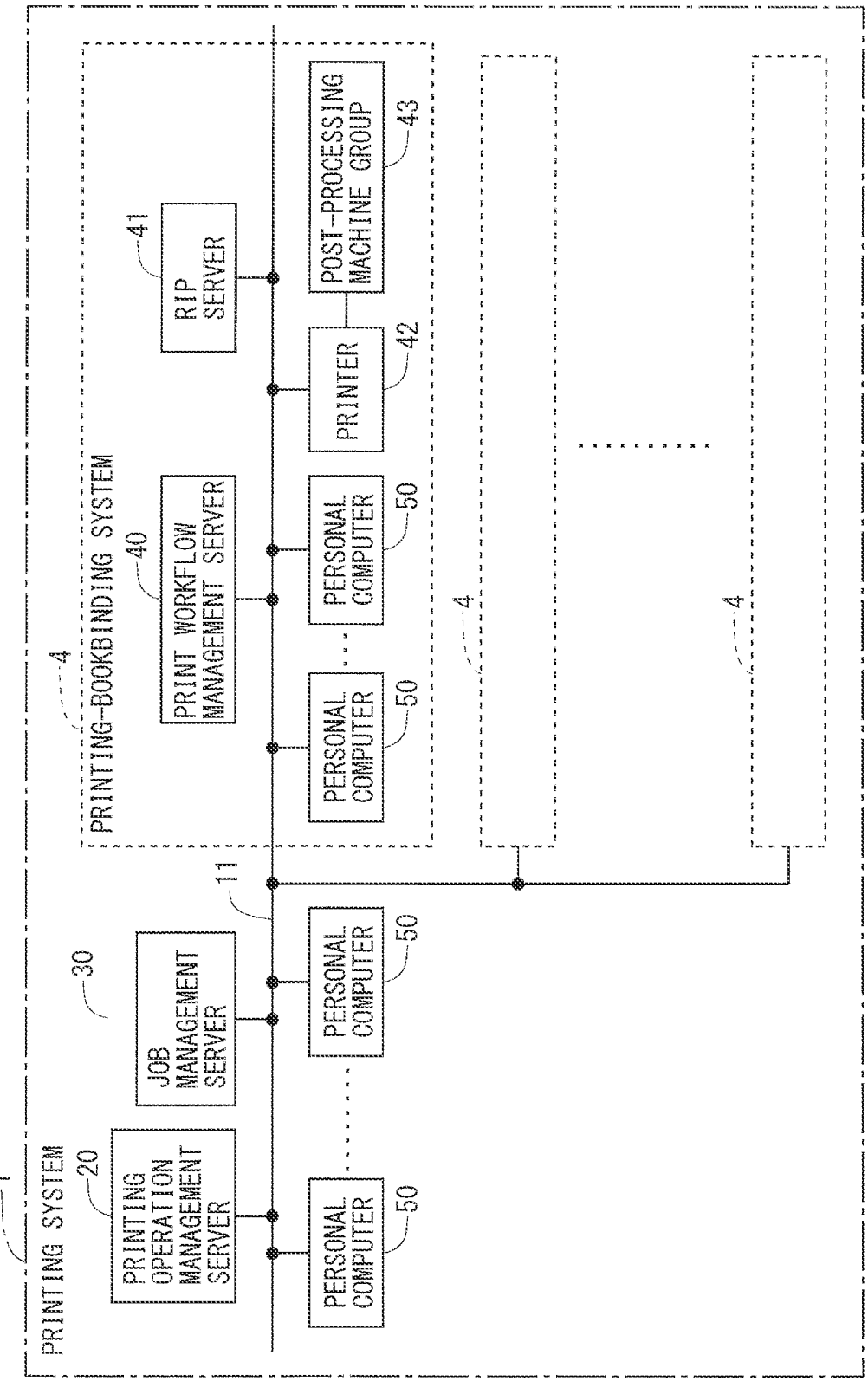
FIG. 2 is a block diagram showing a hardware configuration of the printing system in the first embodiment.

A configuration of a printing system 1 according to a first embodiment will be described with reference to FIGS. 1 and 2. FIG. 1 a block diagram showing a schematic configuration of a printing system 1 in the present embodiment. FIG. 2 is a block diagram illustrating a hardware configuration of the printing system 1 in the present embodiment.

As shown in FIG. 1, the printing system 1 in the present embodiment includes a printing operation management system 2, job management system 3, and a plurality of printing-bookbinding systems 4. Note that one line on which printing and bookbinding are performed corresponds to one printing-bookbinding system 4.

The printing operation management system 2 is a system for managing the entire operation related to printing and is called a "management information system (MIS)". Originally, although a system that processes information by using a computer for management is called MIS, in the printing industry, a system that not only manages printing instructions to a printer and print results but also manages the entire print operation including order placement, cost management, inventory management, and the like is called MIS. When an order for printing and bookbinding is placed (e.g., an order is placed via a network or order placement data is inputted by an operator) with the printing operation management system 2, order information (printing-bookbinding job information) including information related to specifications of a job (printing-bookbinding job) based on the order is transmitted from the printing operation management system 2 to the job management system 3.

The job management system 3 receives order information for a plurality of jobs generated depending on order placement for printing and bookbinding and performs job management such as collecting jobs of the same type or setting a sequence of execution of jobs such that the printing-bookbinding process using the plurality of printing-bookbinding systems 4 is performed efficiently. In the present embodiment, a job group obtained by collecting (grouping) a plurality of jobs is generated by the job management system 3, and instruction of printing and bookbinding can be given from the job management system 3 to the printing-bookbinding system 4 on the basis of the job group.

The printing-bookbinding system 4 performs a series of processes related to printing and bookbinding such as generation of print data, printing by a printer, and post-processing by a post processing machine on the basis of the printing and bookbinding instruction given from the job management system 3. Although the plurality of printing-bookbinding systems 4 are included in the printing system 1 in FIGS. 1 and 2, the present invention can also be applied to a case where only one printing-bookbinding system 4 is included in the printing system 1. In the following description, attention is focused on one printing-bookbinding system 4 among the plurality of printing-bookbinding systems 4.

As shown in FIG. 2, the printing system 1 includes a printing operation management server 20, a job management server 30, a print workflow management server 40, a raster image processor (RIP) server 41, a printer 42, a post-processing machine group 43, and a plurality of personal computers 50. The printing operation management server 20, the job management server 30, the print workflow management server 40, the RIP server 41, the printer 42, and the plurality of personal computers 50 are communicably connected by a network 11 such as a local area network (LAN). The printer 42 and the post-processing machine group 43 are connected directly. That is, in the present embodiment, an inline configuration is employed. Note that the print workflow management server 40, the RIP server 41, the printer 42, the post-processing machine group 43, and one or the plurality of personal computers 50 constitute one printing-bookbinding system 4.

In the printing operation management server 20, a program is installed to achieve the printing operation management system 2. In the job management server 30, a program (job management program) is installed to achieve the job management system 3. In the print workflow management server 40, a program is installed to achieve a print workflow system that manages a series of processes for performing printing by using the printer 42. The RIP server 41 performs a RIP process (rasterization process) on data in a vector format generated by performing an imposition process using submitted data. The personal computer 50 performs various operations on the printing operation management system 2, the job management system 3, and the print workflow system via the network 11, for example.

The printer 42 is schematically formed of a printer body and a controller thereof. In the present embodiment, the printer 42 is a digital printer (e.g., inkjet printer) and performs continuous feed printing on rolled paper. Furthermore, a plurality of speeds are prepared as settable print speeds in the printer 42. For example, 100 mpm and 50 mpm are prepared as settable print speeds in the printer 42.

The post-processing machine group 43 includes a plurality of post-processing machines each configured to perform post-processing on a printed sheet (print medium). The configuration of the post-processing machine group 43 is not particularly limited. For example, as shown in FIG. 18, the post-processing machine group 43 is formed of the sheet cutter 431, the folding machine 432, the gathering machine 433, the binding machine 434, and the cutting machine 435.

In the print workflow system, a plurality of flatplan templates defining how to arrange each of pages constituting submitted data on a sheet as templates is held, and a plurality of job templates in which printing conditions such as a print speed, a base material to be used, and a resolution at the time of executing printing are set as templates is held. The job management system 3 is configured to be able to refer to information of the plurality of flatplan templates and the plurality of job templates, and in the job management system 3, each job is associated with one of the plurality of flatplan templates and is associated with one of the plurality of job templates.

<1.2 Hardware Configuration of Job Management Server>

Figure 3:
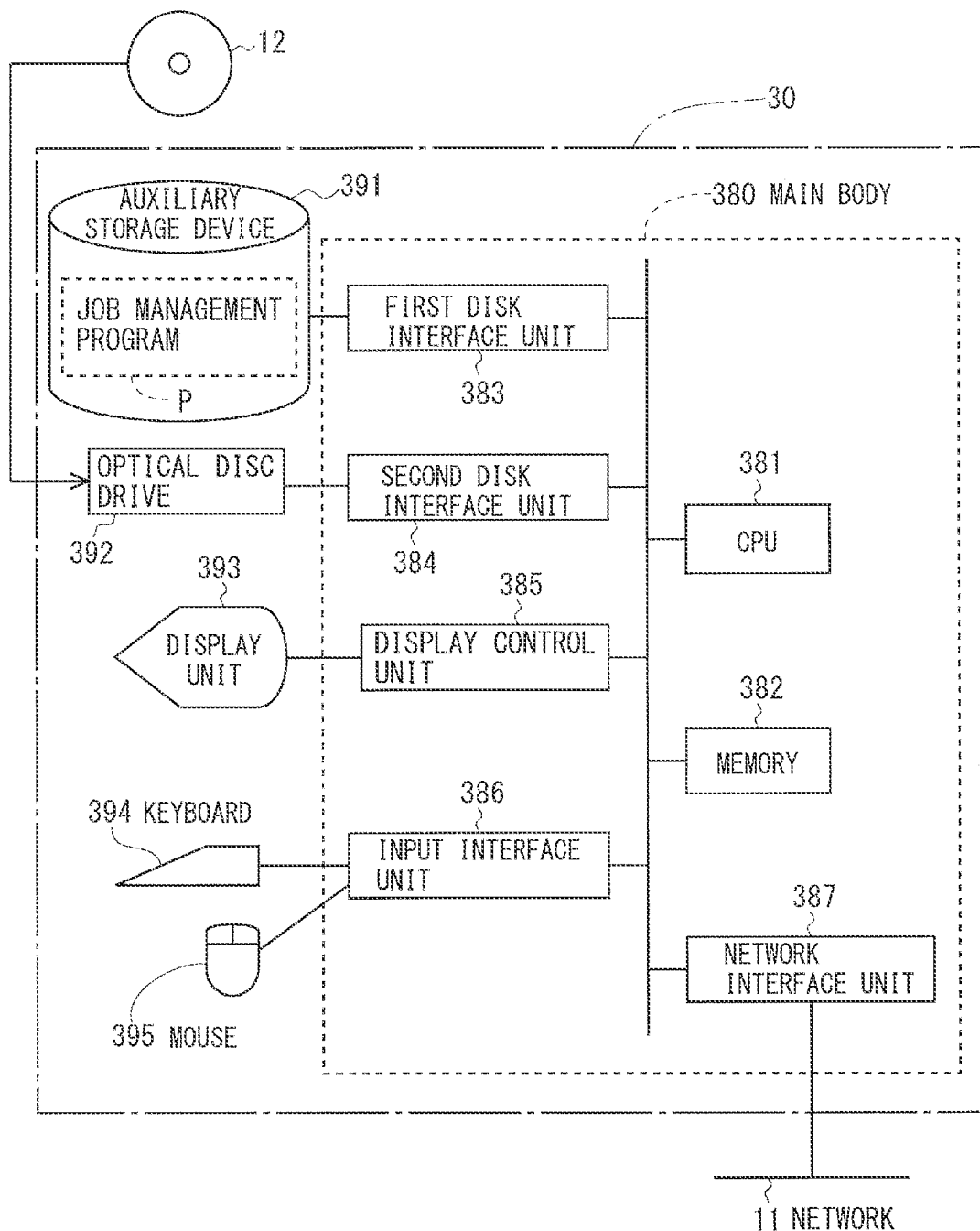
FIG. 3 is a block diagram showing a hardware configuration of a job management server in the first embodiment.

FIG. 3 is a block diagram showing a hardware configuration of the job management server 30. As shown in FIG. 3, the job management server 30 includes a body 380, an auxiliary storage device 391, an optical disc drive 392, a display unit 393, a keyboard 394, a mouse 395, and the like. The body 380 includes a central processing unit (CPU) (processor) 381, a memory 382, a first disc interface unit 383, a second disc interface unit 384, a display control unit 385, an input interface unit 386, and a network interface unit 387. The CPU 381, the memory 382, the first disc interface unit 383, the second disc interface unit 384, the display control unit 385, the input interface unit 386, and the network interface unit 387 are connected to each other via a system bus. The auxiliary storage device 391 is connected to the first disc interface unit 383. An optical disc drive 392 is connected to the second disc interface unit 384. A display unit. (display device) 393 is connected to the display control unit 385. A keyboard 394 and a mouse 395 are connected to the input interface unit 386. A network 11 is connected to the network interface unit 387. The auxiliary storage device 391 is a magnetic disc device or the like. An optical disc 12 as a computer-readable recording medium, such as a compact disc read-only memory (CD-ROM) or a digital versatile disc read-only memory (DVD-ROM), is inserted into the optical disc drive 392. The display unit 393 is a quid crystal display or the like. The keyboard 394 and the mouse 395 are used by an operator to input an instruction to the job management server 30.

The auxiliary storage device 391 stores a job management program P. The CPU 381 reads the job management program P stored in the auxiliary storage device 391 into the memory 382 and executes the program to achieve various functions of the job management system. The memory 382 includes random-access memory (RAM) and read-only memory (ROM). The memory 382 functions as a work area for the CPU 381 to execute the job management program P stored in the auxiliary storage device 391. Note that the job management program P is provided by being stored the computer-readable recording medium (non-transitory recording medium). That is, for example, a user purchases the optical disc 12 as the recording medium of the job management program P, inserts the optical disc into the optical disc drive 392, reads the job management program P from the optical disc 12, and installs the job management program P in the auxiliary storage device 391. Alternatively, the job management program P transmitted via the network 11 may be received by the network interface unit 387 and installed in the auxiliary storage device 391.

<1.3 Functional Configuration>

Figure 4:
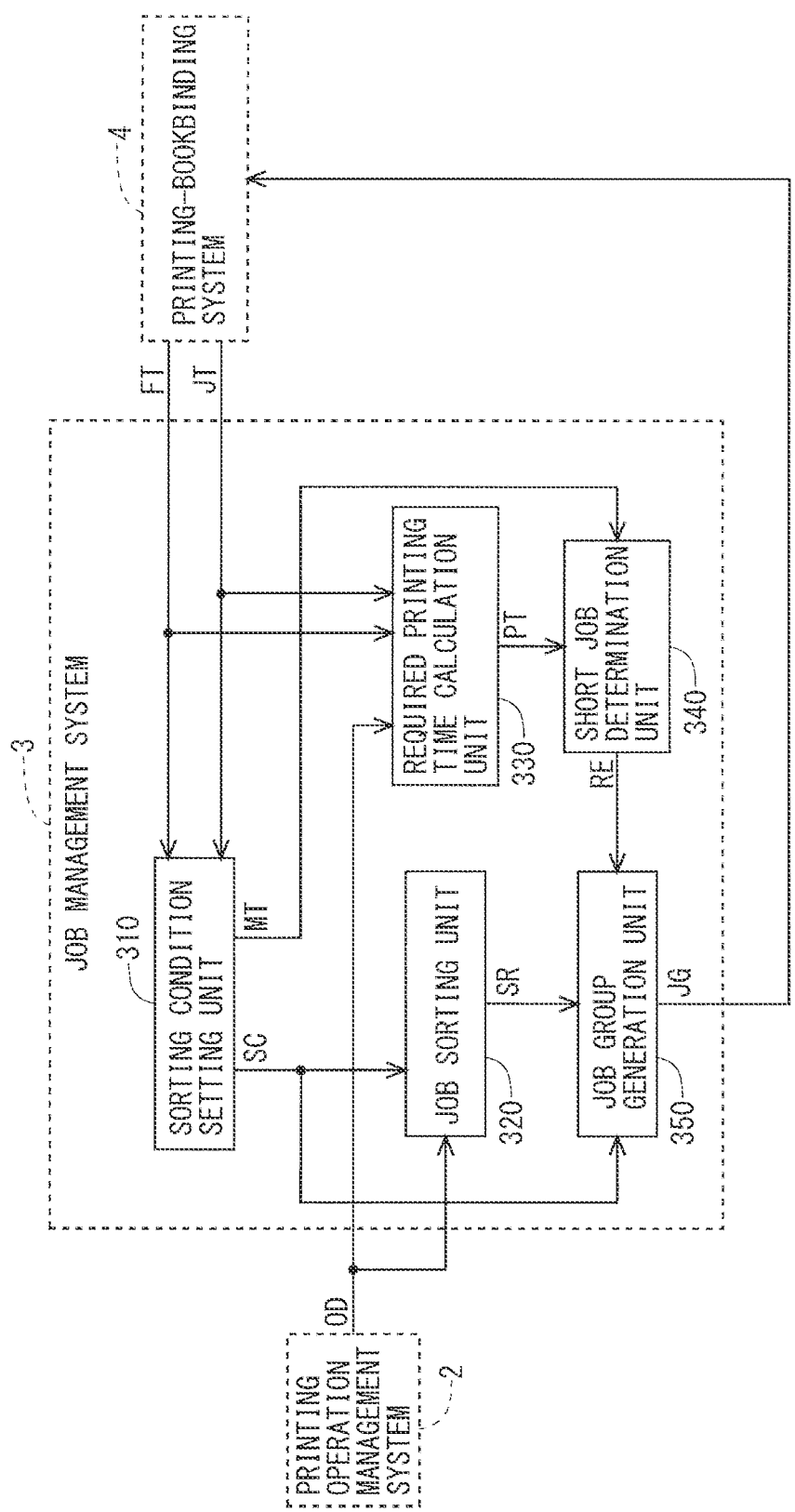
FIG. 4 is a block diagram showing a functional configuration of the job management system in the first embodiment.

FIG. 4 is a block diagram showing the functional configuration of the job management system 3 in the present embodiment. The job management system 3 includes a sorting condition setting unit 310, a job sorting unit 320, a required printing time calculation unit 330, a short job determination unit 340, and a job group generation unit 350. Note that the sorting condition setting unit 310 is a component necessary for a process before starting the actual operation of the printing-bookbinding process by the printing system 1, and the job sorting unit 320, the required printing time calculation unit 330, the short job determination unit 340, and the job group generation unit 350 are components necessary for a process at the time of the actual operation of the printing-bookbinding process by the printing system 1.

The sorting condition setting unit 310 sets a condition (sorting condition SC) for sorting a plurality of jobs based on order information CD transmitted from the printing operation management system 2 into a plurality of groups. Specifically, content that can be given as the order information CD from the printing operation management system 2 are associated with a flatplan template FT and a job template JT such that each job is associated with one of the plurality of flatplan templates FT and one of the plurality of job templates JT at the time of operation. In addition, a minimum processing time MT required for processing in the short job determination unit 340 to be described later is set. Further, a setting related to sorting of jobs determined as short jobs by the short job determination unit 340 is performed. In this regard, in the present embodiment, it is assumed that the sorting condition setting unit 310 performs a setting for sorting a job determined as a short job and a job not determined as a short job into different job groups.

The job sorting unit 320 sorts a plurality of jobs into a plurality of groups on the basis of order information (order information for a plurality of jobs) OD transmitted from the printing operation management system 2 and a sorting condition SC defined in advance by the sorting condition setting unit 310. Specifically, each job is associated with one of the plurality of flatplan templates FT and one of the plurality of job templates JT on the basis of the sorting condition SC. Thereby, one group is formed by a plurality of jobs associated with the same flatplan template FT and associated with the same job template JT.

The required printing time calculation unit 330 calculates a time per set (required printing time PT) required co execute printing based on each job by the target printer 42 on the basis of the order information OD and the information of the flatplan template FT and the job template JT associated with each job.

The short job determination unit 340 compares the required printing time PT for each job with the minimum processing time MT set by the sorting condition setting unit 310 and determines a job for which the required printing time PT is shorter than the minimum processing time MT as a short job. As described above, regarding a step of performing post-processing, there is a time restriction on a switching mechanism for shifting from a process for a certain set (one copy) to a process for a next set (one copy). Therefore, a minimum time required from the start point of the process of one set to the start point of the process of the next one set in the post-processing machine is set as the minimum processing time MT by the sorting condition setting unit 310.

The job group generation unit 350 generates a job group JG defining a plurality of jobs to be grouped on the basis of a result SR of sorting by the job sorting unit 320 and a result RE of the process by the short job determination unit 340. Specifically, based on a plurality of jobs sorted into the same group by the job sorting unit 320, the job group generation unit 350 generates one job group JG by grouping jobs not determined as short jobs by the short job determination unit 340, and generates another job group JG by grouping jobs determined as short jobs by the short job determination unit 340. The information on the job group JG is transmitted to the printing-bookbinding system 4. Hereinafter, the job group JG obtained by grouping jobs not determined as short jobs is referred to as a "standard job group", and the job group JG obtained by grouping jobs determined as short jobs is referred to as a "short job group". Note that a first-type job group is achieved by the standard job group, and a second-type job group is achieved by the short job group.

<1.4 Flow of Process>
<1.4.1 Overall Process>

Figure 5:
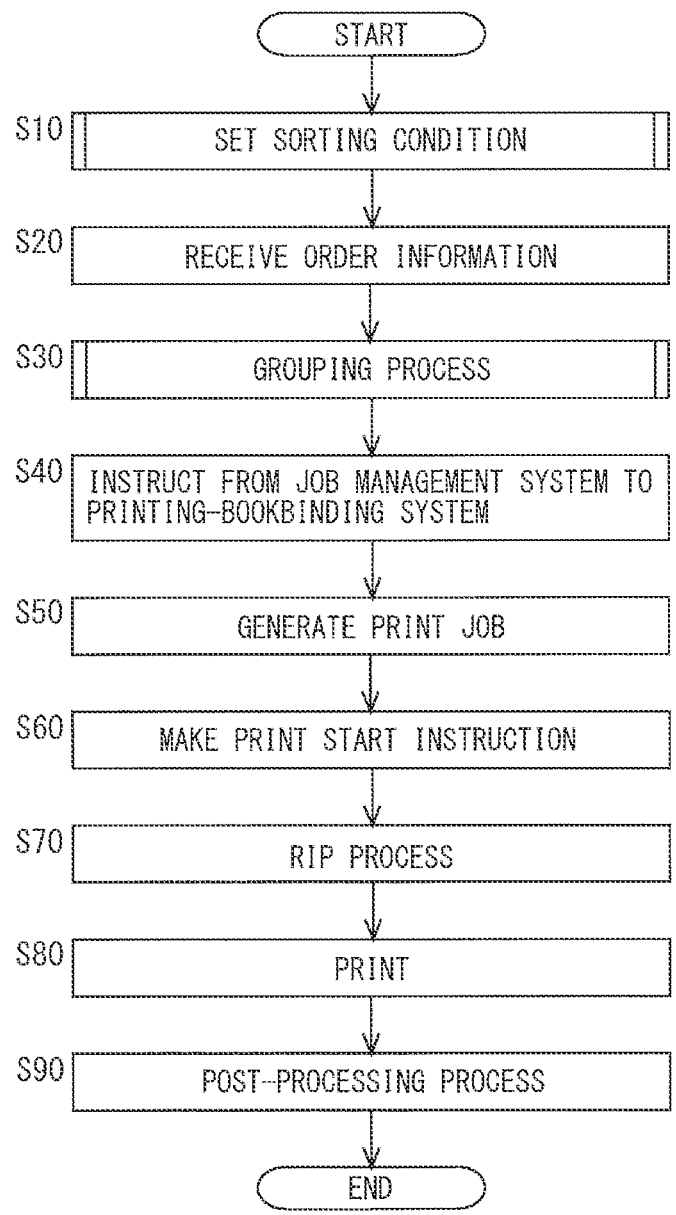
FIG. 5 is a flowchart showing an overall process flow the first embodiment.

FIG. 5 is a flowchart showing an overall process flow in the present embodiment. It is assumed that the printing-bookbinding system 4 in the present embodiment employs an on-the-fly method in which the RIP process and the printing process in the printer 42 are performed in parallel.

First, the sorting condition setting unit 310 sets the sorting condition SC described above (step S10). The setting of the sorting condition SC will be described in detail later. Note that the process in step S10 is a process performed before the actual operation of the printing-bookbinding process is started, and the following processes from step S20 to step S90 are repeated during the actual operation.

In step S20, the job management system 3 receives the order information OD transmitted from the printing operation management system 2. It is assumed that a plurality of pieces of order information OD is collectively received by the job management system 3 in this step S20. Next, a grouping process of generating a job group JG by grouping a plurality of jobs on the basis of the plurality of order information OD received by the job management system 3 in step S20 and the sorting condition SC set in step S10 is performed (step S30). The grouping process will be described in detail later.

After the completion of the grouping process, an instruction command is given from the job management system 3 to the printing-bookbinding system 4 including the printer 42 used for printing (step S40). In step S40, first, for the job group JG generated in step S30, the job management system 3 instructs the print workflow system constituting the target printing-bookbinding system 4 to generate a print job. Next, the job management system 3 instructs an operator of the target printer 42 to execute printing based on the job group JG generated in step S30. For example, a screen prompting execution of printing based on the job group JG generated in step S30 is displayed on the controller of the printer 42 or the print workflow management server 40. Further, an instruction of a print sequence at the time of executing printing based on the short job group is made from the job management system 3 to the print workflow system.

Thereafter, in the print workflow system, a print job is generated on the basis of the instruction command given from the job management system 3 (step S50). In this regard, in the print workflow system, for each job constituting the job group JG to be processed, first, a preflight check is performed to inspect whether there is a problem in submitted data, and thereafter, an imposition process, addition of an accessory/barcode, and the like are performed in accordance with a flatplan template.

After the generation of the print job, the operator checks the process status of each job constituting the job group JG to be processed by the controller of the printer 42 and makes a print start instruction for a job without an error (step S60). Thereby, for each job to be printed, first, the RIP process is performed (step S70), and then printing by the printer 42 is executed (step S80). In the present embodiment, the job included in the short job group is associated with a job template set at a lower print speed than the job template associated with the standard job group. Therefore, in step S80, printing based on the standard job group is executed at a relatively high speed, and printing based on the short job group is executed at a relatively low speed.

Note that the processes in steps S60 to S80 are performed for each of the short job group and the standard job group. For example, the operator first makes a print start instruction for the short job group. Then, after the completion of printing for all the jobs constituting the short job group, the operator stops the operation of the printer 42. Thereafter, the operator makes a print start instruction for the standard job group. Thus, the print start instruction is made by the operator twice.

Finally, the printed sheet is sent from the printer 42 to the post-processing machine group 43, and post-processing process is performed (step S90). In this regard, the printed sheet based on the job (standard job) constituting the standard job group is directly sent from the printer 42 to the post-processing machine group 43 at a relatively high speed. In contrast, the printed sheet based on the job (short job) constituting the short job group is directly sent from the printer 42 to the post.-processing machine group 43 at a relatively low speed.

In a case where the on-the-fly method is not employed, the processes up to the RIP process are completed for all the jobs constituting the job group to be processed in step S50, and when the print start instruction is made by the operator in step S60, the printing by the printer 42 (step S80) is executed.

<1.4.2 Setting of Sorting Condition>

A detailed procedure for setting the sorting condition (step S10 of FIG. 5), will be described with reference to FIG. 6. First, an operation is performed to define the order information OD used for the printing operation management system 2 to instruct the job management system 3 to perform printing and bookbinding (step S100). At the time of performing the printing-bookbinding process, information for identifying a job such as a job name and a job ID, information related to content such as a page size, the number of pages, and a full pathname of submitted data (typically a PDF file), and information related to a base material such as a sheet name are required. Therefore, the order information OD is defined so as to include the necessary information.

Next, the content that can be given as the order information OD from the printing operation management system 2 is associated with the flatplan template FT and the job template JT (step S110). Each flatplan template FT includes information of the number of pages allocated to a sheet (hereinafter referred to as "the number of allocated pages"), information of a sheet size (sheet length, sheet width), information of an accessory/barcode to be added to a sheet, and the like. Further, each job template JT includes information on a print speed, information on a base material, information on resolution, and the like. In step S110, in consideration of the information included in each flatplan template FT and the information included in each job template JT, the content that can be given as the order information OD is associated with the flatplan template FT and the job template JT such that the printing-bookbinding process based on each job is performed suitably.

Next, a rearrangement condition for the plurality of jobs included in each job group JG is sen such that printing based on the plurality of jobs included in each job group JG is executed in a desired sequence (step S120). In the present embodiment, it is assumed that conditions are set such that rearrangement is performed in ascending order of the required printing time PT described above. By performing such a setting, a change in thickness for one set is reduced in the post-processing machine. As a result, the post-processing process (bookbinding process) is stably performed, and a high-quality product is obtained.

Next, the above-described minimum processing time (minimum time required from the start point of the process for one set to the start point of the process for the next one set in post-processing machine) MT is set such that it is possible to determine whether or not each job is determined as a short job (step S130).

Finally, a generation rule of the job group JG is defined (step S140). In the present embodiment, a rule for sorting a job determined as a short job and a job not determined as a short job into different job groups JG is defined. In addition, a naming rule of the job group JG and a rule as to which job template JT a job determined as a short job is associated with are defined.

<1.4.3 Grouping Process>

A detailed procedure of the grouping process (step S30 of FIG. 5) will be described with reference to FIG. 7. First, a process of sorting the plurality of jobs based on the order information OD received by the job management system 3 in step S20 of FIG. 5 into a plurality of groups is performed by the job sorting unit 320 (step S300). The process is performed on the basis of the order information OD of each job and the sorting condition SC set in step S10 of FIG. 5. Thereby, each job is associated with one of the plurality of flatplan templates FT and is associated with one of the plurality of job templates JT.

Next, the required printing time calculation unit 330 calculates, for each job, the above-described required printing time (time per set required to execute printing based on each job by the target printer 42) PT (step S310). The process of step S310 will be described in detail later.

Figure 6:
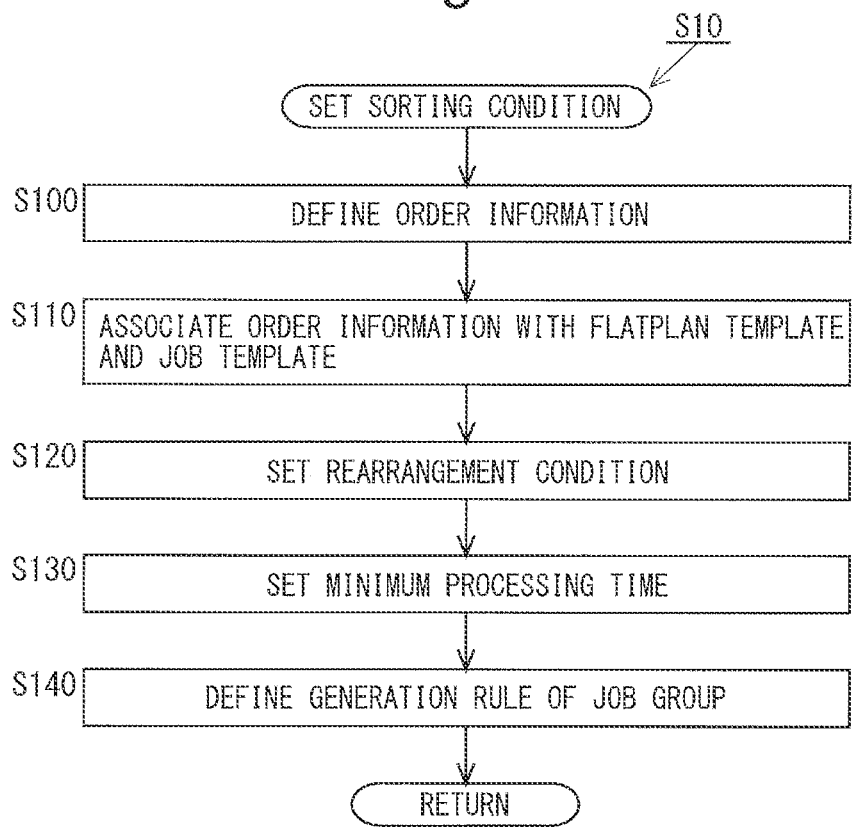
FIG. 6 is a flowchart showing a detailed procedure for setting a sorting condition is the first embodiment.

Next, the short job determination unit 340 compares the minimum processing time MT set in step S130 of FIG. 6 with the required printing time PT calculated in step S310 for each job and determines a job for which the required printing time PT is shorter than the minimum processing time MT as a short job (step S320).

Finally, based on the plurality of jobs sorted into the same group in step S300, the job group generation unit 350 generates a standard job group obtained by grouping jobs not determined as short jobs in step S320 and generates a short job group obtained by grouping jobs determined as short jobs in step S320 (step S330). Step S330 will be described later in detail.

<1.4.4 Calculation of Required Printing Time>

A detailed procedure for calculating the required printing time (step S310 of FIG. 7) will be described with reference to FIG. 8. Here, attention is focused on the process for one job. Note that the following processes in steps S311 to S315 are processes performed by the required printing time calculation unit 330.

First, necessary information for obtaining the print length per set is extracted from the order information OD for the job to be processed (step S311). In the present embodiment, information of the number of pages is extracted as the necessary information. Next, necessary information for obtaining the print length per set is extracted from the flatplan template FT associated with the job to be processed (step S312). In the present embodiment, information on the number of allocated pages and information on the sheet length are extracted as the necessary information.

Next, the print length per set is calculated on the basis of the information on the number of pages extracted in step S311 and the information on the number of allocated pages and the information on the sheet length extracted in step S312 (step S313). When the number of pages is represented as Np, the number of allocated pages is represented as Na, and the sheet length is represented as Ls, a print length Lp per set is calculated by the following equation (1).

$$Lp = (Np/Na) \times Ls \qquad (1)$$

Note that "Np/Na" in the above equation (1) is the number of sheets per set, and here, "Np/Na" is assumed to be an integer.

After the print length per set is calculated, necessary information for obtaining the required printing time PT is extracted from the job template JT associated with the job to be processed (step S314). In the present embodiment, information on the print speed is extracted as the necessary information.

Finally, the required printing time PT is obtained by dividing the print length calculated in step S313 by the print speed acquired in step S314 (step S315).

<1.4.5 Generation of Job Group>

Figure 9:
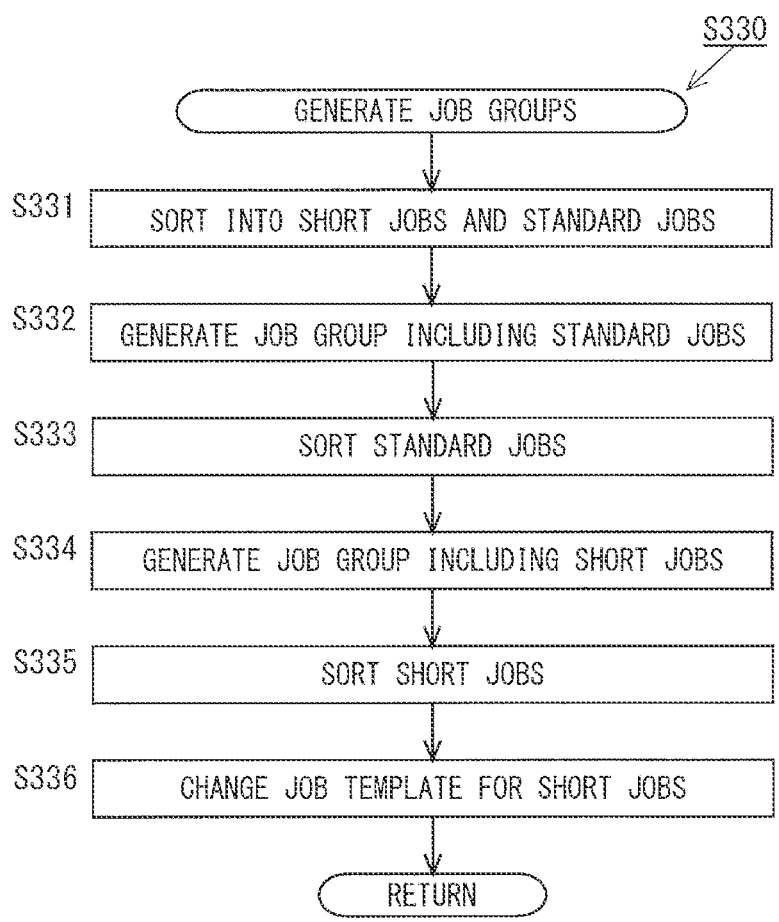
FIG. 9 is a flowchart showing a detailed procedure for generating a job group in the first embodiment.

A detailed procedure for generating the job group JG (step S330 of FIG. 7) be described with reference to FIG. 9. Here, attention is focused on the process for a plurality of jobs sorted into the same group in step S300 of FIG. 7. Note that the following processes in steps S331 to S336 are processes performed by the job group generation unit 350.

Figure 7:
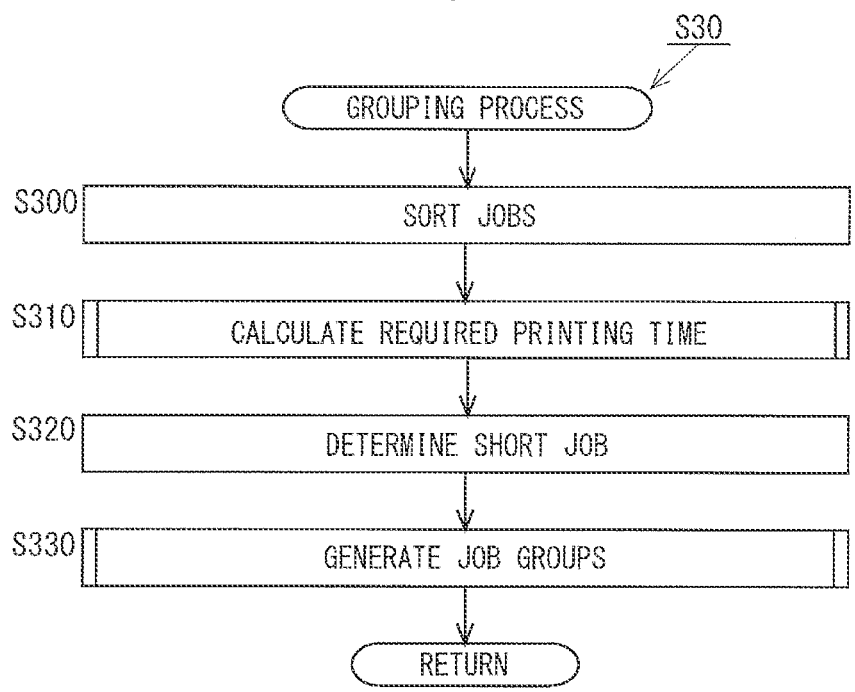
FIG. 7 is a flowchart showing a detailed procedure of a grouping process in the first embodiment.
Figure 8:
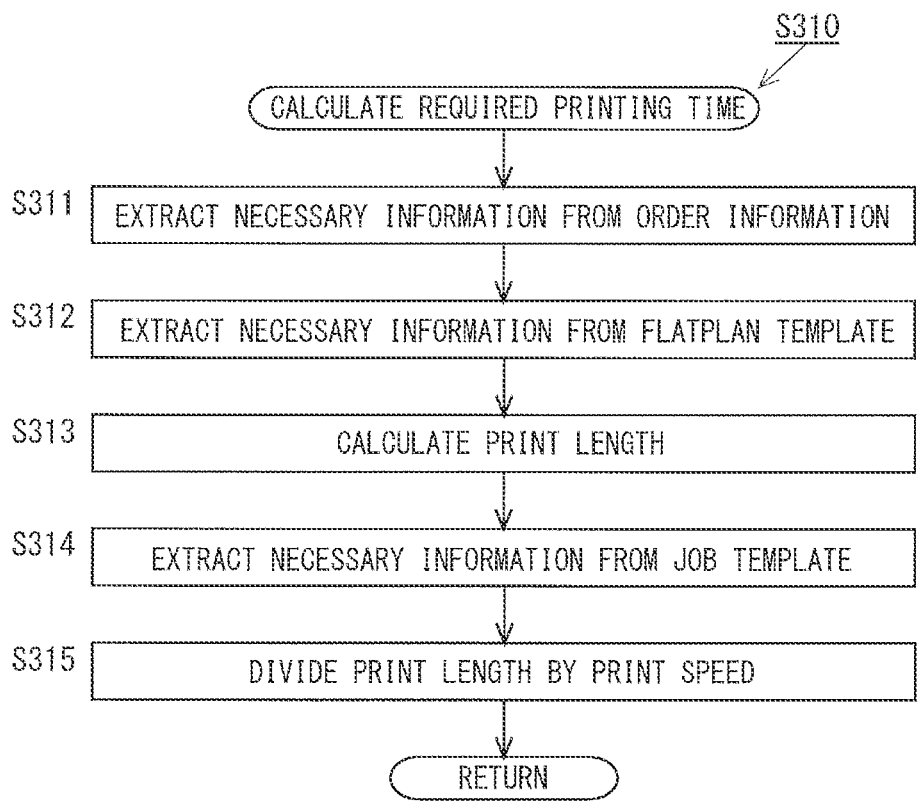
FIG. 8 is a flowchart showing a detailed procedure for calculating a required printing time is the first embodiment.

First, a plurality of jobs are sorted into short jobs and standard jobs on the basis of the result of step S320 of FIG. 7 (step S331). For example, it is assumed that five jobs (job Ja, job Jb, job Jc, job Jd, job Je) are sorted into the same group, and the job Ja and the job Jb among the five jobs are determined as short jobs in step S320 of FIG. 7. In this case, the job Ja and the job Jb are sorted as short jobs, and the job Jc, the job Jd, and the job Je are sorted as standard jobs.

Next, a standard job group including the jobs sorted as standard jobs in step S331 is generated (step S332). In the above example, a standard job group including the job Jc, the job Jd, and the job Je is generated. Then, for the standard job group generated in step S332, rearrangement based on the required printing time PT calculated in step S310 of FIG. 7 is performed (step S333). In the present embodiment, the standard jobs are rearranged in ascending order of the required printing time PT. In the above example, when the required printing time PT of the job Jc is the longest, and the required printing time PT of the job Jd is the shortest, the rearrangement is performed such that printing is executed in the sequence of "the Job Jd, the Job Je, and the Job Jc" for the standard job group.

Next, a short job group including the jobs sorted as short jobs in step S332 is generated (step S334). In the above example, a short job group including the job Ja and the job Jb is generated. Then, for the short job group generated in step S334, rearrangement based on the required printing time PT calculated in step S310 of FIG. 7 is performed (step S335). In the present embodiment, the short jobs are rearranged in ascending order of the required printing time PT. In the above example, when the required printing time PT of the job Jb is shorter than the required printing time PT of the job Ja, the rearrangement is performed such that printing is executed in the sequence of "the Job Jb and the Job Ja" for the short job group.

Finally, the job template JT determined as a template to be used in printing based on the short job is changed (step S336). In this regard, in order to prevent the occurrence of an error in the post-processing machine, printing based on short jobs needs to be performed at a lower speed than printing based on standard jobs. Therefore, in step S336, the job template JT is changed such that the print speed set in the job template JT after the change is lower than the print speed set in the job template JT before the change.

<1.5 Specific Example>

Hereinafter, a specific example of generating the job group JG and the time required for entire printing will be described. Here, it is assumed that seven jobs (jobs J1 to J7) for printing and bookbinding for a pocket edition are sorted into the same group by the job sorting unit 320, and attention is focused on the seven jobs.

Figure 10:
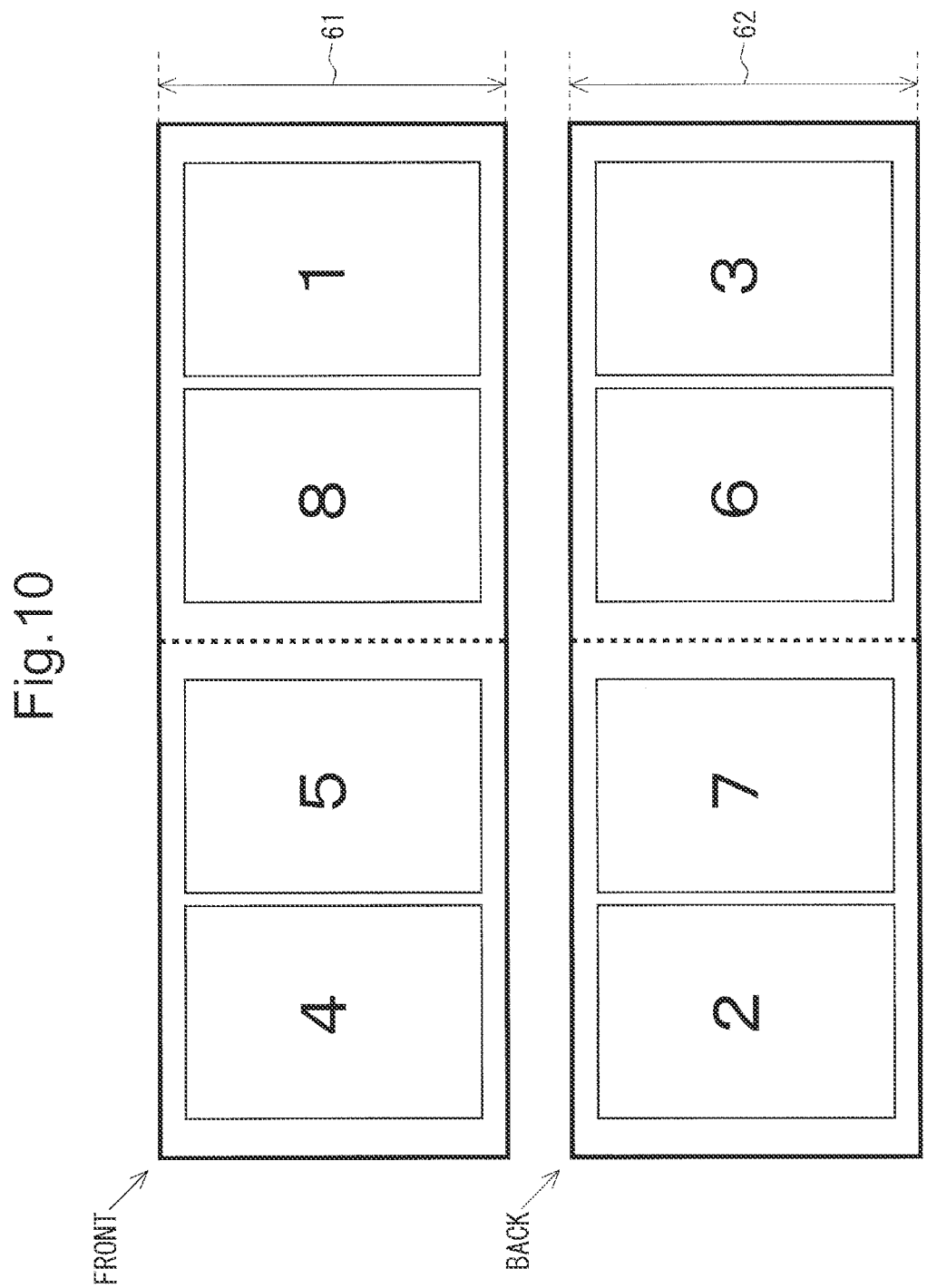
FIG. 10 is a diagram for explaining a specific example in the first embodiment.

FIG. 10 is a diagram schematically snowing a state of page allocation to one sheet in the flatplan template FT associated with the seven jobs. As can be seen from FIG. 10, four pages are allocated to each of the front and back surfaces of the sheet. Therefore, the number of allocated pages described above is eight.

The size of the pocket edition is 105 mm in the horizontal direction and 148 mm in the vertical direction. In addition, a margin for adding a mark or a barcode for post-processing is required for the sheet. Here, it is assumed that a margin of 10 mm is required at each of the upper portion (so-called "top") and the lower portion (so-called "bottom") of the print region of the content, and the sheet length (the lengths of each of arrows denoted by reference numerals 61, 62 in FIG. 10) is set to 170 mm (0.17 m).

FIG. 11 shows the number of pages, the number of sheets, and the print length per set of each of the jobs J1 to J7. In this regard, since the number of allocated pages is eight, the number of sheets is calculated by dividing the number of pages by eight for each job. Further, since the sheet length is 0.17 m, the print length per set is calculated by multiplying the number of sheets by 0.17 for each job.

FIG. 12 shows the required printing times PT (unit: second) of the jobs J1 to J7 at the respective print speeds of four stages. The required printing time PT is calculated by dividing the print length per set (see FIG. 11) by the print speed. For example, the print length per set for the job J2 is 5.1 m, so that the required printing time PT of the job J2 when the print speed is 75 mpm (1.25 mps) is calculated as 4.08 seconds by dividing 5.1 by 1.25.

Here, if the minimum processing time MT described above is 5 seconds, as can be grasped from FIG. 12, when the print speed is set to 100 mpm, an error occurs in the post-processing machine at the time of executing printing based on the job J1, printing based on the job J2, printing based on the job J3, and printing based on the job J4, and when the print speed is set to 75 mpm, an error occurs in the post-processing machine at the time of executing printing based on the job J1 and printing based on the job J2. When the print speed is set to 50 mpm or 25 mpm, no error occurs in the post-processing machine at the time of executing printing based on any job.

Therefore, conventionally, in the case as described above, printing based on the jobs J1 to J7 is executed with the print speed set to 50 mpm. At this time, when the print length in all the jobs is 8,000 m, the time required for the entire printing is 160 minutes as shown in FIG. 13.

In contrast, in the present embodiment, in the case as described above, the print speed is set to 50 mpm at the time of executing printing based on a short job, but the print speed is set to 100 mpm at the time of executing printing based on a standard job (a job other than a short job). When 5% of the print lengths in all the jobs correspond to short jobs, printing for 400 m is performed at a print speed of 50 mpm, and printing for 7,600 m is performed at a print speed of 100 mpm. Note that it takes a predetermined time from the end of printing based on the short job to the start of printing based on the standard job, and waste paper (waste sheet) occurs. For example, in a case where the time required from the end of printing based on the short job to the start of printing based on the standard job is four minutes, and waste paper of 50 m occurs, a result as shown in FIG. 14 is obtained. That is, the time required for printing based on the short job is 8 minutes, the time required for switching the print speed is 4 minutes, and the time required for printing based on the standard job is 76 minutes. From the above, the total required time is 88 minutes. Thus, the time required for the entire printing is greatly reduced as compared with the related art.

<1.6 Effects>

According to the present embodiment, the required printing time PT, which is the time per set required to execute printing by the target printer 42 for each job, is compared with the minimum processing time MT, which is the minimum time required for the process for one set in the post-processing machine, and a job for which the required printing time PT is shorter than the minimum processing time MT is determined as a short job. Then, based on a plurality of jobs sorted into the same group on the basis of specifications of each job, a standard job group obtained by grouping jobs (standard jobs) riot determined as short jobs and a short job group obtained by grouping jobs determined as short jobs are generated. Here, by executing printing based on the short job group at a low speed and executing printing based on the standard job group at a high speed, it is possible to shorten the total printing time as much as possible while preventing the occurrence of an error in the post-processing machine. As above, according to the present embodiment, the printing system 1 capable of improving productivity more than before without causing an error in the post-processing machine is achieved.

2. Second Embodiment

A second embodiment of the present invention will be described. Hereinafter, differences from the first embodiment will be mainly described.

<2.1 Outline and Configuration>

In the first embodiment, the job groups JG are generated such that a job determined as a short job and a job not determined as a short job belong to different job groups JG. In contrast, in the present embodiment, the job group JG is generated such that a job determined as a short job and a job not determined as a short job belong to the same job group JG. At this time, the job group JG is generated such that printing based on an aggregate (hereinafter referred to as a "standard job block") of jobs not determined as short jobs is executed after printing based on an aggregate (hereinafter referred to as a "short job block") of jobs determined as short jobs is executed.

A schematic configuration of the printing system 1, a hardware configuration of the printing system 1, and a hardware configuration of the job management server 30 are similar to those in the first embodiment, and thus description thereof is omitted (see FIGS. 1 to 3). However, the printer 42 in the present embodiment includes acceleration means that increases the print speed during the execution of printing. For example, 100 mpm and 50 mpm are prepared as settable print speeds in the printer 42, and the printer 42 is configured to be able to change the print speed from 50 mpm to 100 mpm during the execution of printing.

The functional configuration of the job management system 3 is similar to that of the first embodiment except for the following points (see FIG. 4). In the present embodiment, the sorting condition setting unit 310 performs a setting for collecting a job determined as a short job and a job not determined as a short job into the same job group JG. That is, in step S140 of FIG. 6, a rule for collecting a job determined as a short job and a job not determined as a short job to the same job group JG is defined. The job group generation unit 350 generates one job group JG by collecting a job not determined as a short job by the short job determination unit 340 and a job determined as a short job by the short job determination unit 340 on the basis of the above setting by the sorting condition setting unit 310.

Note that the printing based on the short job block may be executed after the printing based on the standard job block is executed. That is, the job group JG may be generated by the job group generation unit 350 such that the printing based on the standard job block is executed after the printing based on the short job block is executed, or the job group JG may be generated by the job group generation unit 350 such that the printing based on the short job block is executed after the printing based on the standard job block is executed.

<2.2 Generation of Job Group>

Figures 15, 16, 17:
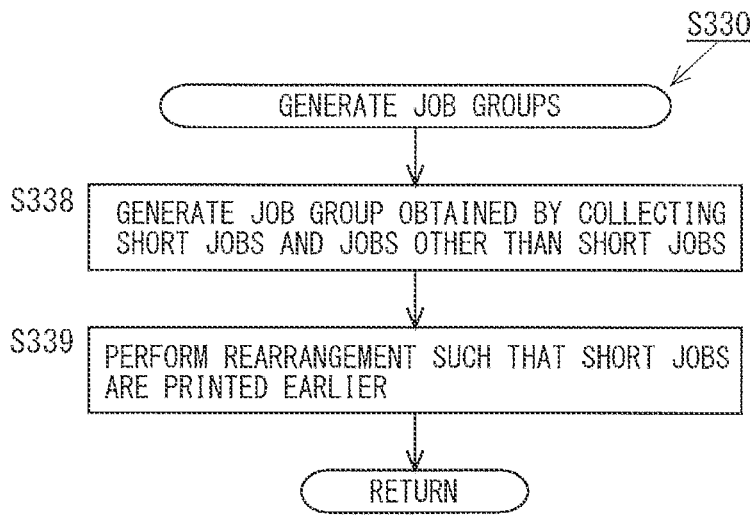
FIG. 15 is a flowchart showing a detailed procedure for generating a job group is a second embodiment of the present invention.
FIG. 16 is a diagram for explaining a specific example in the second embodiment.
FIG. 17 is a diagram for explaining a specific example in the second embodiment.

FIG. 15 is a flowchart showing a detailed procedure for generating the job group JG (step S330 of FIG. 7) in the present embodiment. Here, too, attention is focused on the process for a plurality of jobs sorted into the same group in step S300 of FIG. 7. Note that the following processes in steps S338 and S339 are processes performed by the job group generation unit 350.

First, one job group JG obtained by collecting jobs determined as short jobs and jobs not determined as short jobs in step S320 of FIG. 7 is generated (step S338). For example, in a case where five jobs (job Ja, job Jb, job Jc, job Jd, job Je) are sorted into the same group, a job group JG including the five jobs is generated regardless of the result of step S320 of FIG. 7.

Next, with respect to the job group JG generated in step S338, rearrangement is performed such that printing is executed earlier for the jobs determined as the short jobs in step S320 of FIG. 7 than for the jobs not determined as the short jobs in step S320 of FIG. 7 (step S339). For example, it is assumed that the job Ja and the job Jb among the five jobs are determined as short jobs in step S320 of FIG. 7. In this case, the rearrangement is performed such that printing is executed earlier for the "jobs Ja and Jb" than for the "jobs Jc, Jd, and Je". More specifically, in the present embodiment, both the jobs not determined as the short jobs (Job Jc, Job Jd, Job Je) and the jobs determined as the short jobs (Job Ja, Job Jb) are rearranged in ascending order of the required printing time PT calculated in step S310 of FIG. 7. As above, consequently, the rearrangement is performed such that printing based on the five jobs is executed in ascending order of the required printing time PT.

<2.3 Specific Example>

Hereinafter, a specific example of the time required for the entire printing in the present embodiment will be described focusing on the case shown in the first embodiment (FIGS. 10 to 13). Again, it is assumed that the total print length is 8,000 m, and 5% of the total print length corresponds to the short job. As shown in FIG. 13, conventionally, the time required for the entire printing in this case is 160 minutes.

In the present embodiment, when it is possible to accelerate the print speed from 15 mpm (initial speed) to 100 mpm, printing for 400 m corresponding to the short job block is performed at a print speed of 15 mpm, and printing for 7,600 m corresponding to the standard job block is performed at a print speed of 100 mpm. Thus, a result as shown in FIG. 16 is obtained regarding the required time. That is, the time required for printing based on the short job block is 27 minutes, and the time required for printing based on the standard job block is 76 minutes. From the above, the total required time is 103 minutes.

In the present embodiment, when it is possible to accelerate the print speed from 50 mpm (initial speed) to 100 mpm, printing for 400 m corresponding to the short job block is performed at a print speed of 50 mpm, and printing for 7,600 m corresponding to the standard job block is performed at a print speed of 100 mpm. Therefore, a result as shown in FIG. 17 is obtained regarding the required time. That is, the time required for printing based on the short job block is 8 minutes, and the time required for printing based on the standard job block is 76 minutes. From the above, the total required time is 84 minutes.

<2.4 Effects>

According to the present embodiment, as in the first embodiment, a job in which the required printing time PT is shorter than the minimum processing time MT is determined as a short job. Then, a job group JG obtained by grouping a plurality of jobs sorted into the same group on the basis of specifications of each job is generated such that printing based on a standard job block obtained by collecting jobs not determined as short jobs is executed after printing based on a short job block obtained by collecting jobs determined as short jobs is executed. Here, after the printing based on the short job block is executed at a low speed, the print speed is accelerated to perform the printing based on the standard job block at a high speed, whereby it is possible to shorten the entire printing time as much as possible while preventing the occurrence of an error in the post-processing machine. As above, as in the first embodiment, the printing system 1 capable of improving productivity more than before without causing an error in the post-processing machine is achieved.

3. Others

The present invention is not limited to the above embodiments, and various modifications can be made without departing from the gist of the present invention.

For example, in the first embodiment, two job groups (short job group and standard job group) is generated from a plurality of jobs sorted into the same group by the job sorting unit 320. However, the present invention is not limited thereto, and three or more job groups JG may be generated from a plurality of jobs sorted into the same group by the job sorting unit 320. Then, printing may be executed at a different print speed for each job group such that no error occurs in the post-processing machine and the overall printing time is as short as possible.

In the second embodiment, the job group JG including the short job block and the standard job block is generated on the basis of a plurality of jobs sorted into the same group by the job sorting unit 320. However, the present invention is not limited thereto, and a job group JG including three or more job blocks (job aggregate) may be generated on the basis of a plurality of jobs sorted into the same group by the job sorting unit 320. Then, printing may be executed at a different print speed for each job block such that no error occurs in the post-processing machine and the overall printing time is as short as possible.

Furthermore, in each of the above embodiments, the in-line configuration is employed where the printer 42 and the post-processing machine group 43 are connected directly. However, the present invention is not limited thereto. The present invention can also be applied to a case where a non-in-line configuration is employed. An error caused by the magnitude relationship between the print speed and the processing speed of the post-processing machine does in the non-in-line configuration. However, by appropriately sorting a plurality of jobs into a plurality of job groups JG, it is possible to effectively utilize resources even in the case where the non-in-line configuration is employed.

4. Appendix

A printing system having a configuration described below is also conceivable from the above disclosure.

A printing system including a printer that is capable of executing continuous printing for each job group made up of a plurality of jobs and sends a printed print medium to a post-processing machine, the printing system including:
  a processor; and
  a memory that stores a program,
  wherein when the program stored in the memory is executed by the processor, the program causes the processor to:
    sort a plurality of jobs into a plurality of groups on a basis of printing-bookbinding job information including information related to specifications of each job and a predefined sorting condition;
    calculate a required printing time that is a time per set required for the printer to perform printing on a basis of each job;
    compare the required printing time for each job with a minimum processing time that is a minimum time required from a start point of the process for one set to a start point of a process for a next one set in the post-processing machine and determine, as a short job, a job for which the required printing time is shorter than the minimum processing time; and
    generate a first-type job group obtained by grouping jobs each not determined as the short job and generate a second-type job group obtained by grouping 1 obs each determined as the short job, based on a plurality of jobs sorted into same group.

A printing system including a printer that is capable of executing continuous printing for each job group made up of a plurality of jobs and sends a printed print medium to a post-processing machine, the printing system including:
  a processor; and
  a memory that stores a program,
  wherein when the program stored in the memory is executed by the processor, the program causes the processor to:
    sort a plurality of jobs into a plurality of groups on a basis of printing-bookbinding job information including information related to specifications of each job and a predefined sorting condition;
    calculate a required printing time that is a time per set required for the printer to perform printing on a basis of each job;
    compare the required printing time for each job with a minimum processing time that is a minimum time required from a start point of the process for one set to a start point of a process for a next one set in the post-processing machine and determine, as a short job, a job for which the required printing time is shorter than the minimum processing time; and
    generate a job group obtained by grouping a plurality of jobs sorted into same group such that printing based on a standard job block obtained by collecting jobs each not determined as the short job is executed after printing based on a short job block obtained by collecting the jobs each determined as the short job is executed, or the printing based on the short job block is executed after the printing based on the standard job block is executed.

This application is an application claiming priority based on Japanese Patent Application No. 2021-032715 entitled "PRINTING SYSTEM AND PRINTING METHOD" filed on Mar. 2, 2021, and the contents of which are herein incorporated by reference.

What is claimed is:

1. A printing system including a printer that is capable of executing continuous printing for each job group made up of a plurality of jobs and sends a printed print medium to a post-processing machine, the printing system comprising:
   a job sorting unit configured to sort a plurality of jobs into a plurality of groups on a basis of printing-bookbinding job information including information related to specifications of each job and a predefined sorting condition;
   a required printing time calculation unit configured to calculate a required printing time that is a time per set required for the printer to perform printing on a basis of each job;
   a short job determination unit configured to compare the required printing time for each job with a minimum processing time that is a minimum time required from a start point of a process for one set to a start point of a process for a next one set in the post-processing machine and determine, as a short job, a job for which the required printing time is shorter than the minimum processing time; and
   a job group generation unit configured to generate a first-type job group obtained by grouping jobs each not determined as the short job by the short job determination unit and generate a second-type job group obtained by grouping jobs each determined as the short job by the short job determination unit, based on a plurality of jobs sorted into same group by the job sorting unit.

2. The printing system according to claim 1, wherein
   a first speed and a second speed lower than the first speed are prepared for the printer as settable print speeds,
   a print speed of the first-type job group is set to the first speed, and
   a print speed of the second-type job group is set to the second speed.

3. The printing system according to claim 2, wherein
   the print medium after printing based on the first-type job group is directly sent from the printer to the post-processing machine at the first speed, and
   the print medium after printing based on the second-type job group is directly sent from the printer to the post-processing machine at the second speed.

4. The printing system according to claim 1, wherein the required printing time calculation unit is configured to calculate a print length per set for a job to be processed on a basis of the printing-bookbinding job information for the job to be processed and information included is a flatplan template associated with the job to be processed among a plurality of flatplan templates including information for specifying an arrangement position of pages on a print medium for one sheet, and calculate the required printing time for the job to be processed by dividing the print length by a print speed set for a job template associated with the job to be processed among a plurality of job templates defining print conditions including a print speed.

5. The printing system according to claim 4, wherein the required printing time calculation unit is configured to calculate the print length on a basis of information on the number of pages included in the printing-bookbinding job information, information on a sheet length included in the flatplan template, and information on the number of pages allocated to one sheet included in the flatplan template.

6. The printing system according to claim 1, wherein the job group generation unit is configured to generate the first-type job group such that printing based on jobs each not determined as the short job by the short job determination unit is executed in ascending order of a length of the required printing time, and generate the second-type job group such that printing based on jobs each determined as the short job by the short job determination unit is executed in ascending order of the length of the required printing time.

7. A printing system including a printer that is capable of executing continuous printing for each job group made up of a plurality of jobs and sends a printed print medium to a post-processing machine, the printing system comprising:
- a job sorting unit configured to sort a plurality of jobs into a plurality of groups on a basis of printing-bookbinding job information including information related to specifications of each job and a predefined sorting condition;
- a required printing time calculation unit configured to calculate a required printing time that is a time per set required for the printer to perform printing on a basis of each job;
- a short job determination unit configured to compare the required printing time for each job with a minimum processing time that is a minimum time required from a start point of a process for one set to a start point of a process for a next one set in the post-processing machine and determine, as a short job, a job for which the required printing time is shorter than the minimum processing time; and
- a job group generation unit configured to generate a job group obtained by grouping a plurality of jobs sorted into same group by the job sorting unit such that printing based on a standard job block obtained by collecting jobs each not determined as the short job by the short job determination unit is executed after printing based on a short job block obtained by collecting jobs each determined as the short job by the short job determination unit is executed, or the printing based on the short job block is executed after the printing based on the standard job block is executed.

8. The printing system according to claim 7, wherein the job group generation unit is configured to generate the job group such that the printing based on the standard job block is executed after the printing based on the short job block is executed.

9. The printing system according to claim 8, wherein
a first speed and a second speed lower than the first speed are prepared for the printer as settable print speeds, and the printer is configured to be capable of accelerating a print speed from the second speed to the first speed during printing.

10. The printing system according to claim 9, wherein
when the print speed of the printer is set to the first speed, the printed print medium is directly sent from the printer to the post-processing machine at the first speed, and
when the print speed of the printer is set to the second speed, the printed print medium is directly sent from the printer to the post-processing machine at the second speed.

11. The printing system according to claim 8, wherein the job group generation unit is configured to generate the job group such that printing based on a plurality of jobs sorted into same group by the job sorting unit is executed in ascending order of a length of the required printing time.

12. The printing system according to claim 7, wherein the required printing time calculation unit is configured to calculate a print length per set for a job to be processed on a basis of the printing-bookbinding job information for the job to be processed and information included in a flatplan template associated with the job to be processed among a plurality of flatplan templates including information for specifying an arrangement position of pages on a print medium for one sheet, and calculate the required printing time for the job to be processed by dividing the print length by a print speed set for a job template associated with the job to be processed among a plurality of job templates defining print conditions including a print speed.

13. The printing system according to claim 12, wherein the required printing time calculation unit is configured to calculate the print length on a basis of information on the number of pages included in the printing-bookbinding job information, information on a sheet length included in the flatplan template, and information on the number of pages allocated to one sheet included in the flatplan template.

14. A printing method in a printing system including a printer that is capable of executing continuous printing for each job group made up of a plurality of jobs and sends a printed print medium to a post-processing machine, the printing method comprising:
- a job sorting step of sorting a plurality of jobs into a plurality of groups on a basis of printing-bookbinding job information including information related to specifications of each job and a predefined sorting condition;
- a required printing time calculation step of calculating a required printing time that is a time per set required for the printer to perform printing on a basis of each job;
- a short job determination step of comparing the required printing time for each job with a minimum processing time that is a minimum time required from a start point of a process for one set to a start point of a process for a next one set in the post-processing machine and determining, as a short job, a job for which the required printing time is shorter than the minimum processing time; and
- a job group generation step of generating a first-type job group obtained by grouping jobs each not determined as the short job in the short job determination step and generating a second-type job group obtained by grouping jobs each determined as the short job in the short job determination step, based on a plurality of jobs sorted into same group in the job sorting step.

* * * * *